L. F. Markham. Sheet 1. 2 Sheets.

Book Cutting Mach.

No 235. Reissued Apr. 19. 1853.

L. F. Markham. Sheet 2. 2 Sheets.

Book Cutting Mach.

No. 235.

Reissued Apr. 19, 1853.

UNITED STATES PATENT OFFICE.

LARNARD F. MARKHAM, OF CAMBRIDGEPORT, MASSACHUSETTS.

IMPROVEMENT IN MACHINERY FOR TRIMMING BOOKS, &c.

Specification forming part of Letters Patent No. 5,523, dated April 18, 1848; Reissue No. 235, dated April 19, 1853.

*To all whom it may concern:*

Be it known that I, LARNARD F. MARKHAM, of Cambridgeport, in the county of Middlesex and State of Massachusetts, have invented a new and useful Machine for Trimming the Edges of Books; and I do hereby declare that the same is fully described and represented in the following specification and accompanying drawings, letters, figures, and references thereof.

Figure 1:
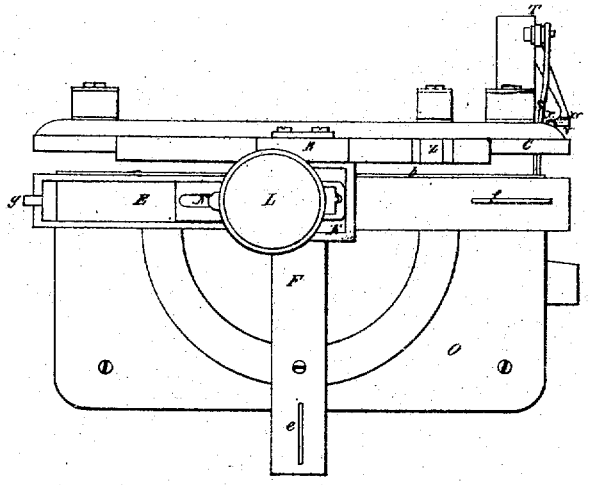
Figure 2:
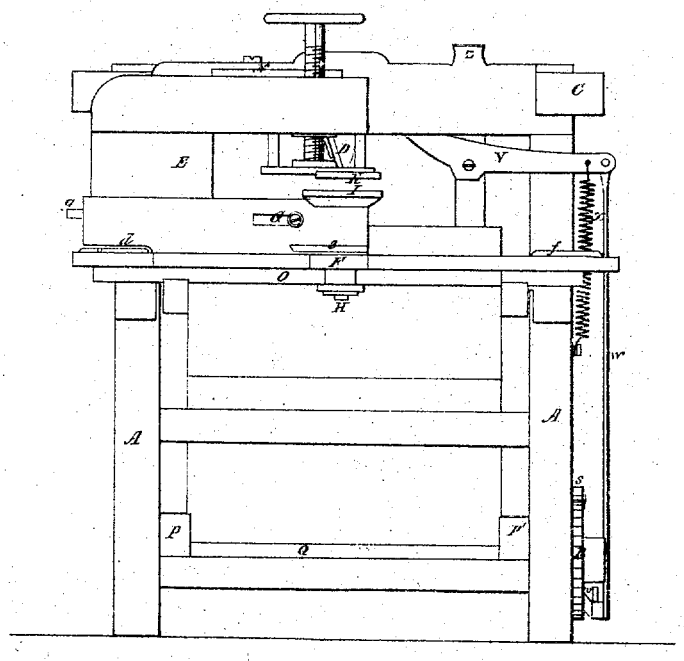
Figure 5:
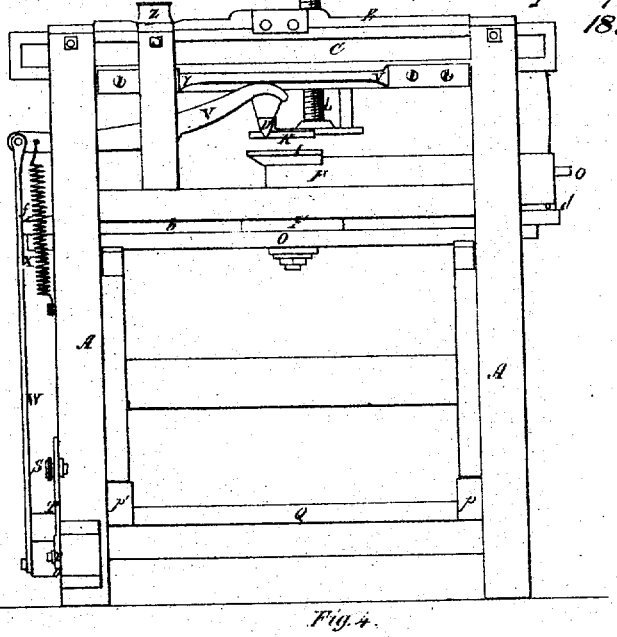
Figure 3:
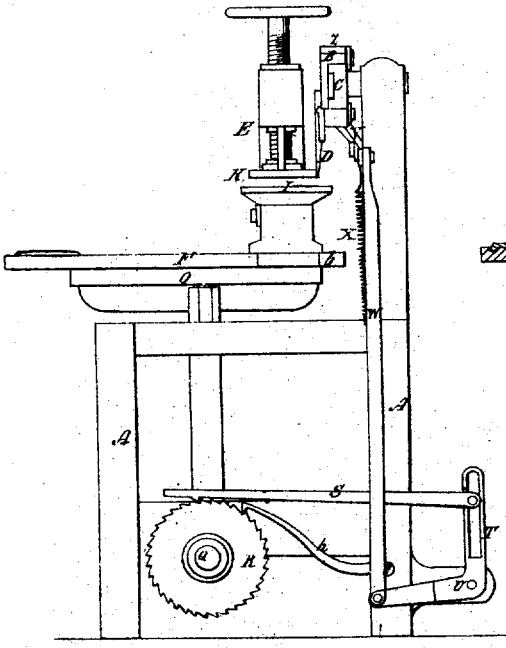
Figure 4:
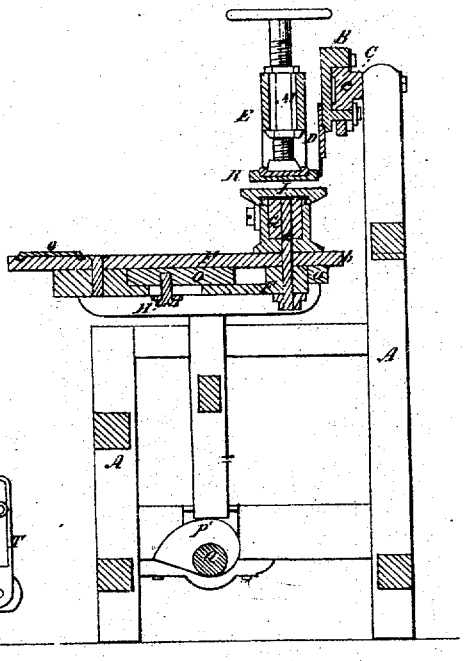

Of said drawings Figure 1 exhibits a top view of my said machine. Fig. 2 is a front elvation of it. Fig. 3 is an end elevation. Fig. 4 is a central vertical and transverse section, and Fig. 5 is a rear elevation of it.

In said drawings A denotes the main frame, which serves to sustain the respective parts of the machine. B is a plain stock or cutter-holder, which is sustained in position and made to slide freely back and forth on a horizontal rail or bar, C. Said cutter-holder supports a sharp cutter or knife, D, which is made to extend downward from it at right angles to it, as seen is the drawings. Directly in front of said cutter-holder, in what I term as the "turning" or "adjustable" book-holder E, which is made to turn or be moved horizontally on a pivot or pin, *a*, and within a semicircle. Said pivot or turning-pin extends vertically from a table or a sliding plate or frame, F, and enters through a sliding box or bearing, G, which should be so applied to the book-holder E as to admit of said book-holder being moved upon it in a direction either toward or away from the cutting-knife, (said book-holder being supposed when so moved to stand at right angles to the rail C,) and when adjusted to any desirable distance from said knife to be there fastened by means of a set-screw, G. Said book-holder is made somewhat like a common seal-press. It has a bed piece or plate, I, affixed to its front end. It also has a small platen or clamp-plate, K, arranged over said bed and made to rise and fall by means of a screw, L, which, for sake of convenience in applying its power to good advantage to the book held or placed between the plates I K, is made to pass through a sliding and adjustable box or nut, M, which should be applied to the upper part of the book-holder frame in such manner as to enable it to be slid or moved toward or from its inner end at pleasure, and fixed in any desirable position by a set-screw, N. The sliding plate or frame F (hereinbefore mentioned) rest on the upper surface of a table, O, and is adapted to it in such manner as to be capable of being moved in a direction toward or away from the cutting-knife, the rear edge, *b*, of the plate or frame being parallel to the plane in which the knife moves in whatever position the said plate may be. The frame F has three projections, *d e f*, raised above its surface in the positions with respect to each other as seen in Figs. 1 and 2. The two *d* and *f* are in line with each other, while the other one, viz, *e*, is at right angles to a straight line drawn from one projection, *d*, to the other, *f*. A spring catch, *g*, is applied to the front end of the turning book-holder, and is made to lock upon either of the projections *d e f*, so as to set the book-holder either parallel to or at right angles to the plane in which the cutting-knife moves, or in other words, so as to enable two of the edges of the book to be cut at right angles to the third. The table O should be applied to the frame A in such manner as to be capable of being raised and lowered vertically for the purpose of gradually elevating the book (confined in the holder) during the operation of trimming any one of its edges. For this purpose the said able rests on two cams, P P′, fixed on a horizontal shaft, Q, which is supported in suitable bearings and has a ratchet wheel, R, on one end of it. Said ratchet-wheel has a pulling-pawl, S, applied to it, said pawl being jointed to one arm of a right-angular or bent lever, T, which is arranged as seen in Fig. 3, and turns on a fulcrum, U. The other arm of said lever is connected to a lever, V, by means of a connecting-rod, W, jointed to it and the lever V. The inner end of said lever V is curved or shaped as seen in Fig. 5, and is borne up against the under side of the cutter stock or holder by a spring, X. Said cutter-holder has two inclined planes, Y Y, arranged in opposite directions to one another and in such manner that they may alternately depress the inner end of the lever V during the reciprocating movements of the cutter-holder B, which is made to move or slide back and forth in a longitudinal direction by the workman or attendant, who applies his hand to a small projection, Z. The reciprocating movements of the cutter-stock create through the lever V, connecting-rod W, lever T, pawl S, and spring X a continuous rotary movement of the ratchet-wheel and its shaft and the cams on said shaft. The rotation of said cams creates a gradual elevation of the table and book-holder until the most eccentric portions of the cams have done their office, which being completed, the table suddenly drops down to its lowest position. The ratchet-wheel has a retaining-pawl, *h*, properly adapted to it.

The object of making the book-holder adjustable upon its turning pivot or pin *a*, while capable of being turned around and made to assume either of three positions, in two of which it is parallel to the cutter-stock, and in the third perpendicular thereto, is to enable a person to adjust the book to be cut in such manner that each of the three edges to be cut or trimmed may be at an equal or like distance from the axis of motion of the book-holder. For this purpose it is not always necessary to use a movable frame or plate, F, made to slide back and forth, as above specified, as said turning book-holder may be applied directly to the rising table on which said frame rests, in which case the turning-pin of the book-holder would project upward from and be fastened in the table.

In cutting books which are very long in comparison to their width, the frame F will be found very useful, as said frame enables a person to readily adjust the top and bottom edges to the cutting-knife, while the middle or long edge is adjusted to it by moving the adjustable book-holder either toward or away from the said knife. In the performance of the first adjustment the book-holder must be turned around and fastened into a position in which it may be parallel to the cutter-holder. So, in the second adjustment, it must be turned around and fastened in a position in which it will be perpendicular to the cutter-holder.

What I claim as my invention is—

1. The turning and adjustable book-holder, arranged as hereinabove described, so as to be made to assume either of the three positions hereinabove specified, and so that the three edges of a book may be trimmed by a single adjustment of the same in said holder, and by the movement of said holder on its pivot consecutively to each of the aforesaid positions, whether such holder be combined with a reciprocating knife or cutter having any other shape or motion.

2. The adjustable frame F, in combination with the turning book-holder or the turning and adjustable book-holder, for the purpose herein above specified.

3. The combination of the table, (on which the book-holder is supported,) arranged so as to be gradually raised to convey the edges of the book to the knife, with a reciprocating knife or any other knife or cutter having any other shape or motion.

LARNARD F. MARKHAM.

Witnesses:

EZRA LINCOLN,

ROBERT L. HARRIS.